United States Patent [19]

Inniss et al.

[11] Patent Number: 5,381,527
[45] Date of Patent: Jan. 10, 1995

[54] SYSTEM FOR EFFICIENT MESSAGE DISTRIBUTION BY SUCCESIVELY SELECTING AND CONVERTING TO AN ALTERNATE DISTRIBUTION MEDIA INDICATED IN A PRIORITY TABLE UPON PREFERRED MEDIA FAILURE

[75] Inventors: Hadyn A. Inniss, Farmington Hills, Mich.; Robert S. Keller, Grapevine, Tex.; William J. Johnson, Flower Mound, Tex.; Marvin L. Williams, Lewisville, Tex.

[73] Assignee: International Business Machines Corporation, Armonk, N.Y.

[21] Appl. No.: 791,818

[22] Filed: Nov. 13, 1991

[51] Int. Cl.⁶ ............................................. G06F 13/14
[52] U.S. Cl. ................................ 395/200; 340/825.03; 364/284.3; 364/DIG. 1; 364/268.9; 371/8.2; 395/500; 395/575
[58] Field of Search ...................... 371/11.1, 11.2, 8.2; 340/825.01, 825.03, 825.81; 395/200, 500, 575

[56] References Cited

U.S. PATENT DOCUMENTS

| | | | |
|---|---|---|---|
| 4,076,961 | 2/1978 | Holsinger et al. | 179/2 |
| 4,672,459 | 6/1987 | Kudo | 358/257 |
| 4,741,037 | 4/1988 | Goldstern | 381/47 |
| 4,850,008 | 7/1989 | Berg et al. | 379/93 |
| 5,274,697 | 12/1993 | Schroeder et al. | 379/98 |

FOREIGN PATENT DOCUMENTS 3-68228  3/1991  Japan .

OTHER PUBLICATIONS

Bowen, Ted Smalley; "Fault-Tolerant Net Hardware Cuts System Downtime;" in *Digital Review*, Jan. 29, 1990 v 7 No. 4 p. 10.

*Primary Examiner*—Thomas C. Lee
*Assistant Examiner*—Jack M. Choules
*Attorney, Agent, or Firm*—David A. Mims; Lisa L. B. Yociss; Andrew J. Dillon

[57] ABSTRACT

A method and system are disclosed for the efficient distribution of messages utilizing a data processing system. A distribution channel is selected in response to a user selection of a particular distribution media. If transmission via the selected distribution channel fails, an alternate distribution media is automatically selected and the message converted to that alternate distribution media. Transmission is then attempted utilizing the alternate distribution media via a different distribution channel. In one depicted embodiment of the present invention the process of automatically selecting a different distribution media and attempting transmission via a different distribution channel continues until such time as a transmission is successful or a specified maximum number of attempted transmissions has occurred.

4 Claims, 3 Drawing Sheets

PRIMARY ELECTRONIC MAIL

| MEDIA | PROCEDURE | COMMENT | PRIORITY |
|---|---|---|---|
| FACSIMILE | CONVERT x1 x2 | Send to fax machine | 1 |
| VOICE TELEPHONE | TELE x1 | Dial Number | 2 |
| VOICE TELEPHONE | TELE x1 | Dial Number | 3 |
| ELECTRONIC MAIL | SEND x1 (x2) | Send Textual Message | 4 |
| VOICE MAIL | MESSAGE x1 | Send Audio Message | 5 |

*Fig. 2*

SYSTEM FOR EFFICIENT MESSAGE DISTRIBUTION BY SUCCESIVELY SELECTING AND CONVERTING TO AN ALTERNATE DISTRIBUTION MEDIA INDICATED IN A PRIORITY TABLE UPON PREFERRED MEDIA FAILURE

BACKGROUND OF THE INVENTION

1. Technical Field

The present invention relates in general to the field of data processing systems and in particular to the field of distributing messages from a user of a data processing system to a recipient, utilizing one of a variety of distribution media. Still more particularly, the present invention relates to a method and system for automatically selecting an alternate distribution media upon the failure of an attempted transmission via a particular distribution channel, and attempting transmission utilizing that alternate distribution media.

2. Description of the Related Art

Electronic communication is increasingly common in the world today. For example, messages or documents may be transmitted between parties separated by great geographic distances utilizing electronic mail, facsimile or voice communication systems.

Automatically rerouting messages or documents in an electronic message distribution system in response to localized problems within the system is well known in the prior art. For example, telephonic communications may be automatically rerouted via an alternate route in the event of a catastrophic failure within the system which affects the normal route. Thus, for example, a facsimile message transmitted via the telephone system from Dallas, Tex. to Chicago, Ill. may normally be routed via St. Louis, Mo. In the event telephone lines in the St. Louis, Mo. vicinity are inoperative or occupied, the document, while still in a facsimile format, could be automatically rerouted to Chicago utilizing telephone lines through Memphis, Tenn.

While systems for rerouting electronic messages or documents via alternate routes are well known in the art, there exists no method or system which permits a message or document to be altered to a different media and transmitted via a completely different system in response to the nonavailability of the system associated with the first media.

It should therefore be apparent that a need exists for a method and system whereby alternate distribution media may be automatically selected, a message converted into the alternate media and transmitted via an alternate system or distribution channel in the event of a failure to successfully transmit the document or message in the media originally selected.

SUMMARY OF THE INVENTION

It is therefore one object of the present invention to provide an improved method and system for the efficient distribution of messages within a system.

It is another object of the present invention to provide an improved method and system for automatically selecting from a plurality of distribution media for the efficient distribution of messages within a system.

It is yet another object of the present invention to provide an improved method and system for the efficient distribution of messages within a system which automatically selects alternate distribution media in response to a failure of transmission via a previously selected distribution channel, and which thereafter automatically attempts transmission of a message using the alternate distribution media.

The foregoing objects are achieved as is now described. A method and system are disclosed for the efficient distribution of messages utilizing a data processing system. A distribution channel is selected in response to a user selection of a particular distribution media. If transmission via the selected distribution channel fails, an alternate distribution media is automatically selected and the message converted to that alternate distribution media. Transmission is then attempted utilizing the alternate distribution media via a different distribution channel. In one depicted embodiment of the present invention the process of automatically selecting a different distribution media and attempting transmission via a different distribution channel continues until such time as a transmission is successful or a specified maximum number of attempted transmissions has occurred.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a pictorial representation of a user interface which may be displayed on a computer display screen in accordance with the method and system of the present invention.

DETAILED DESCRIPTION OF PREFERRED EMBODIMENT

Figure 1:
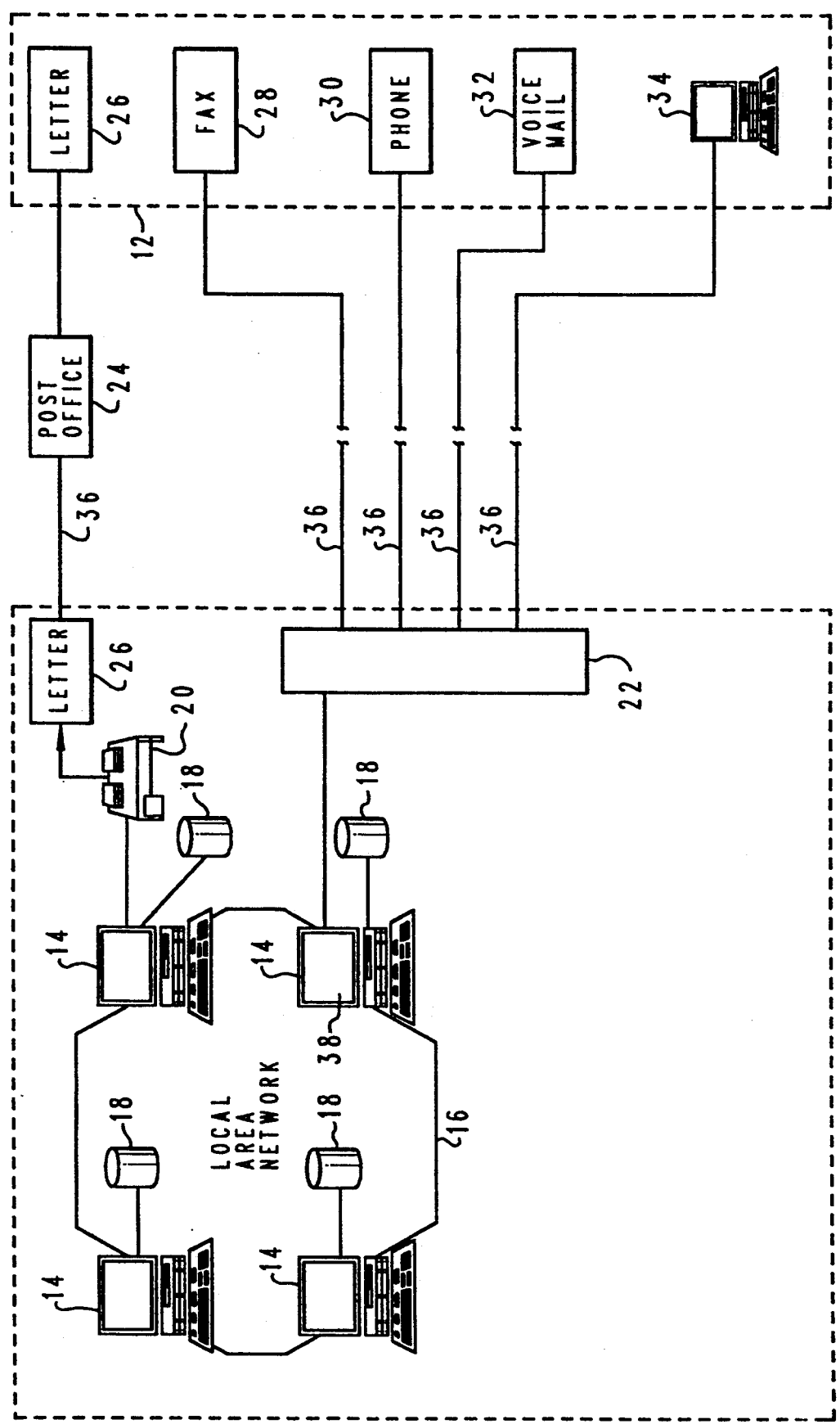
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As may be seen, data processing system 10 may include a plurality of computers 14 which may be connected together in a local area network 16. Of course, those skilled in the art will appreciate that a plurality of intelligent work stations coupled to a host processor may be utilized to implement such network.

As is common in such data processing systems, each individual computer may be coupled to a storage device 18 and/or a printer/output device 20. One or more such storage devices 18 may be utilized, in accordance with the method of the present invention, to store the various data objects or documents which may be periodically accessed and processed by a user within data processing system 10, in accordance with the method and system of the present invention. In a manner well known in the prior art, each such data processing procedure or document may be stored within a storage device 18, which may be associated with a resource manager or library service, which is responsible for maintaining and updating all resource objects associated therewith.

Still referring to FIG. 1, it may be seen that data processing system 10 may communicate with another system 12 which may include a second data processing system, via electronic delivery utilizing a communications network 22, or by physical delivery using a post office 24. System 12 may also receive messages via various distribution channels 36. As utilized herein, the term distribution channel shall include various electronic distribution systems such as telephone lines, a dedicated facsimile line, and radio signals and shall also include various physical delivery systems such as a postal letter carrier or messenger service. A message may be characterized in various distribution media. As utilized herein, the term distribution media shall include such media as facsimile 28, telephone 30, voice mail 32, electronic mail (email) 34, or letter 26.

As will be appreciated upon reference to the foregoing, it is often desirable for a user within data processing system 10 to be able to communicate efficiently with users within system 12. When one distribution channel 36 is unavailable, a user of data processing system 10 may desire to send a message utilizing a different distribution media. In order for a user of data processing system 10 to efficiently distribute messages to a selected user within system 12 it would be desirable to be able to automatically select an alternate distribution media to be utilized in the event of the nonavailability of a selected channel 36 and to automatically attempt transmission of a message utilizing the alternate distribution media via a different distribution channel.

Referring now to FIG. 2, there is illustrated a pictorial representation of a computer display screen 38 on which is depicted a primary electronic mail priority table 40. Utilizing primary electronic mail priority table 40, a user may specify one of a variety of distribution media as noted within Media column 42, such as physical delivery, facsimile, telephone, voice mail, or electronic mail. Comment column 44 allows the user to provide a commentary regarding the particular distribution media selected.

Thereafter, each distribution media is prioritized as noted in Priority column 46. If the system is unable to transmit a message via a selected distribution channel 36, an alternate distribution media designated in primary electronic mail priority table 40 as a first priority will be automatically selected. Transmission will then be automatically attempted via an alternate distribution channel 36, utilizing the automatically selected alternate distribution media. If data processing system 10 is unable to transmit the message utilizing an alternate distribution media which is designated as a first priority, the system of the present invention will then automatically select a distribution media designated as a second priority and attempt transmission utilizing that media via a different distribution channel 36.

For example, still referring to FIG. 2, it will be noted that as listed in Media column 42, if a message was not successfully transmitted due to a failure of a selected distribution channel, the user has selected facsimile as a first alternate distribution media. Therefore, if distribution channel 36 utilized for facsimile 28 is unavailable, the user has selected voice telephone 30 as the next alternate distribution media to be utilized. In accordance with the method and system of the present invention, the system will continue to automatically select an alternate distribution media, as prioritized within primary electronic mail priority table 40, and will continue to attempt transmission utilizing the alternate distribution media, until a transmission is successful or a selected maximum number of attempted transmissions has occurred.

Procedure column 48 lists parameters that the software application of specified distribution media may require in order to receive a message. Examples of such parameters include parity, check bits, and baud rate. These parameters may contain variables that need to be resolved before the parameters are passed to the software application. Either static or dynamic resolution may be utilized. When static resolution is chosen, the information necessary to complete the resolution is supplied. The value of the variables are known before an attempted transmission. When dynamic resolution is chosen, the necessary information must be obtained with the assistance of an external service and then the variables must be resolved. Therefore, for dynamic resolution, the values of the variables are resolved during an attempted transmission.

Figure 3:
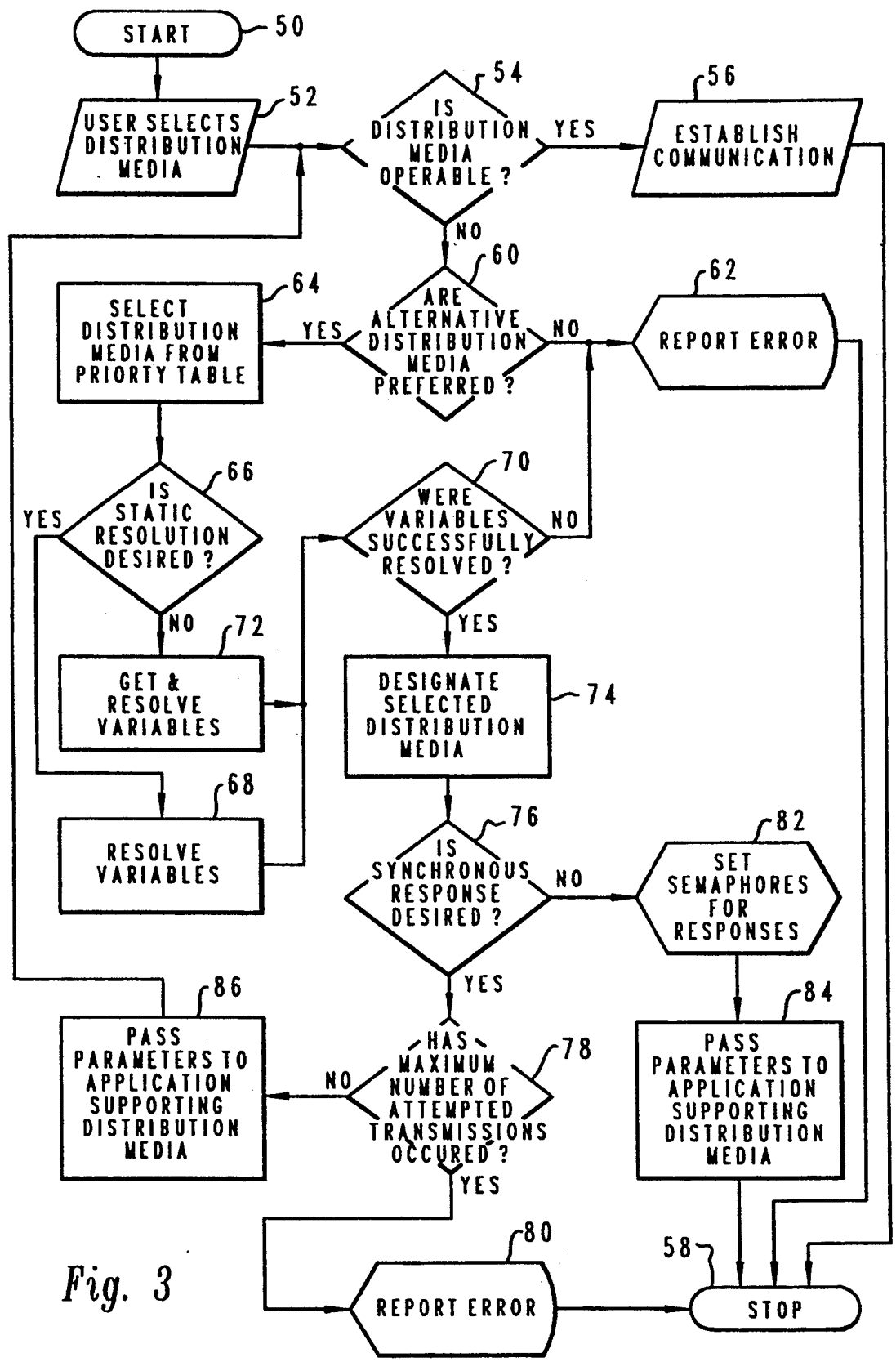
FIG. 3 is a high level flow chart depicting the automatic selection of alternate distribution media in accordance with the method and system of the present invention.

Referring now to FIG. 3, there is illustrated a high level flow chart depicting the automatic selection of an alternate distribution media in accordance with the method and system of the present invention. The process begins at block 50 and thereafter passes to block 52 which illustrates a user in data processing system 10 selecting a distribution media for communication with a recipient within system 12 (see FIG. 1).

Next, block 54 illustrates a determination of whether or not the selected distribution media is available. In the event the distribution media is available, the process passes to block 56 wherein communication is established. The process then terminates as illustrated at block 58.

Referring again to block 54, if a determination is made that the distribution media is not available, the process passes to block 60 wherein a determination is made as to whether or not an alternate distribution media is preferred. In the event an alternate distribution media is not preferred, the process passes to block 62 which illustrates an error message being reported. Thereafter the process terminates as illustrated at block 58.

Referring again to block 60, if a determination is made that an alternate distribution media is preferred, the process passes to block 64. Block 64 depicts the selecting of a distribution media from primary electronic mail priority table 40 (see FIG. 2). The process then passes to block 66 which illustrates a determination of whether or not static resolution of listed parameters is desired. In the event static resolution is desired, control passes to block 68 which depicts the resolving of variables contained within listed parameters to be passed to the application supporting the alternate distribution media, utilizing preassigned values for those variables. Next, block 70 illustrates a determination of whether or not those variables were successfully resolved. If the variables were not successfully resolved, the process passes to block 62 which depicts the reporting of an error message. Thereafter, the process terminates as illustrated at block 58.

Referring again to block 66, if static resolution of variables is not desired, the process passes to block 72 which depicts the retrieving of the necessary variables and, dynamically resolving these variables. The process then passes to block 70, illustrating a determination of whether or not the variables were successfully resolved.

If the necessary variables were successfully resolved, the process passes to block 74 which illustrates the designating of a selected distribution media. Thereafter, block 76 depicts a determination of whether or not a synchronous response is desired. As utilized herein, the term "synchronous response" shall mean that the system of the present invention waits for a response from the application supporting the stated distribution media before processing will continue. Conversely, an asynchronous response shall mean that the present invention invokes the application supporting the distribution media and continues processing, not waiting for a response from the application supporting the distribution media.

If a determination is made that a synchronous response is desired, the process passes to block 78 wherein a determination is made whether or not a maximum number of attempted transmissions has occurred. In the event the maximum number of attempted transmissions has occurred, the process then passes to block 80 which depicts the reporting of an error message. Thereafter the process terminates as illustrated at block 58.

Referring again so block 76, if a determination is made that a synchronous response is not desired, the process passes to block 82 wherein a semaphore is set. As utilized herein, the term "semaphore" shall mean a process that will be executed upon the return of a response from the application supporting the distribution media. Next, the process passes to block 84, which depicts passing the parameters to the application supporting the distribution media. Therefore, the process again terminates, as illustrated at block 58.

Referring again to block 78, if a determination is made that the specified maximum number of attempted transmissions has not occurred, the process passes to block 86 which illustrates the passing of the parameters to the application supporting the distribution media. The process then returns to block 54.

Upon reference to the foregoing those skilled in the art will appreciate that the applicants have disclosed a method whereby alternate distribution media may be automatically selected in response to a failure of transmission of a message via a distribution channel.

While the invention has been particularly shown and described with reference to a preferred embodiment, it will be understood by those skilled in the art that various changes in form and detail may be made therein without departing from the spirit and scope of the invention.

We claim:

1. A method for the efficient distribution of messages within a system having a plurality of distribution channels, each of said distribution channels being characterized by at least one distribution media, said method comprising the steps of:
   selecting a particular one elf said plurality of distribution channels in response to a user selection of a particular distribution media for a selected message;
   attempting transmission of said selected message via said particular one of said distribution channels utilizing said particular distribution media;
   in response to a failure of transmission of said selected message via said particular one of said distribution channels, determining if said user has designated at least one alternate distribution medium among said plurality of distribution media for said selected message in a priority table;
   in response to a determination that said user has designated said at least one alternate distribution medium for said selected message, automatically successively attempting conversion of said selected message to one of said alternate distribution media designated in the priority table and having a next highest priority;
   thereafter, attempting transmission of said selected message via a second one of said distribution channels characterized by said one of said alternate distribution media in response to a successful conversion of said selected message; and
   in response to said failure of transmission and a determination that said user has not designated an alternate distribution medium for said selected message; not attempting conversion of said selected message to an alternate one of said distribution media.

2. The method for the efficient distribution of messages within a system according to claim 1, further comprising the steps of:
   selecting a maximum number of attempted transmissions; and,
   automatically alerting a user upon an occurrence of said maximum number of attempted transmissions.

3. A system for the efficient distribution of messages said system having a plurality of distribution channels, each of said distribution channels being characterized by at least one distribution media, said method comprising the steps of:
   means responsive to a user selection of a particular distribution media for a selected message for selecting a particular one of said plurality of distribution channels;
   means for attempting transmission of said selected message via said particular one of said distribution channels;
   means responsive to a failure of transmission of said selected message via said particular one of said distribution channels for determining if said user has designated at least one alternate distribution median among said plurality of distribution media for said selected message in a priority table;
   means responsive to a determination that said user has designated said at least one alternate distribution medium for said selected message, automatically successively attempting conversion of said selected message to one of said alternate distribution media designated in the priority table and having a next highest priority;
   means for thereafter attempting transmission of said selected message via a second one of said distribution channels characterized by said one of said alternate distribution media in response to a successful conversion of said selected message; and
   means responsive to a determination that said user has not designated an alternate distribution medium for said selected message, not converting said selected message to an alternate one of said distribution media.

4. A system for the efficient distribution of messages according to claim 3, further comprising:
   means for permitting a user to enter a maximum number of attempted transmissions; and,
   means for automatically alerting said user upon an occurrence of said maximum number of attempted transmissions.

* * * * *